UNITED STATES PATENT OFFICE 2,296,396

JOINING MAGNESIUM MEMBERS

Mike A. Miller, New Kensington, Pa., assignor to Aluminum Company of America, Pittsburgh, Pa., a corporation of Pennsylvania No Drawing. Application July 19, 1940, Serial No. 346,372

7 Claims. (Cl. 148—26)

This invention relates to the fusion joining of magnesium and magnesium base alloy members where a flux is employed. Fusion joining, as the expression implies, refers to those joining processes where there is a localized fusion of at least a portion of the metal that connects the structural members. Welding and brazing methods are illustrative of this type of joining.

The term "magnesium," as it is used hereinafter, embraces both pure magnesium and alloys containing at least 50 per cent by weight of that metal.

The joining of magnesium members by a fusion process has been found to be a difficult matter because the metal is chemically very active, being readily attacked by air and salts, among other substances. As a result of this activity, a film of reaction product is always present upon magnesium surfaces exposed to the atmosphere, and this must be completely removed before a good joint can be obtained. Since this film is formed by the action of the atmosphere upon the metal and since it contains a large amount of oxide, it will hereinafter be referred to as an oxide film, and the process by which it is formed will be called oxidation. To effect a sound joint, it is necessary to employ a flux which will produce a disintegration or dispersion of this oxide film and any foreign matter adhering to it. If the removal of the film is not complete, particles of the oxide may become admixed with the fused metal, form porous areas, and may give rise to subsequent corrosion if the occluded particles carry with them particles of the flux. Furthermore, any portions of the film which have not been separated from the magnesium surface tend to cause an uneven flow of the fused metal and thus weaken the joint by preventing a continuous metal-to-metal bond at the interface between the filler metal and the parent metal.

It is also essential that the magnesium be protected during the joining process since this metal can be so readily re-oxidized after the initial oxide coating has once been removed and it may even be ignited by the heating means. This protection is generally provided through use of a flux that is fluid at the temperature at which the joint is made. Furthermore, if the flux chosen does not properly protect the clean magnesium surfaces, both in and adjacent to the joint, pores may be formed in the metal which has been fused as a result of poor flow, even though the metal does not actually ignite. To adequately protect the magnesium surface, the flux must melt at a temperature somewhat below the melting point of the filler metal.

In addition to removing the oxide film and protecting the magnesium surface against further oxidation, a good flux should also effectively wet and adhere to both the molten and solid metal, but not interfere with the flow of the fused metal, during the joining operation. This will cause the fused filler metal to spread evenly over the solid metal and to form a smooth surface.

The magnesium welding art shows that it is desirable to employ as a flux various admixtures of alkali metal halides and to avoid the use of oxidizing agents. One of the alkali metal halides frequently included in these fluxes is lithium chloride because it improves the flow characteristics and activity of the flux toward magnesium. It appears to be more effective in penetrating the oxide film than either sodium or potassium chloride. More than about 5 per cent by weight of this chloride should be present in a flux in order to produce the desired result under commercial operating conditions. Unfortunately, lithium chloride is very hygroscopic and causes water to be absorbed by the flux when it is exposed to the air. This salt vigorously attacks the magnesium in the presence of water with the resultant formation of magnesium oxide which in turn increases the troubles associated with the oxide film formed upon exposure of the metal to the atmosphere. Oxidizing compounds have been omitted from fluxes because it was considered that they would cause the formation of additional oxide.

To minimize the formation of oxide and its attendant adverse effects, it has been necessary heretofore to make the joint immediately after the flux has been applied to the metal surface, especially if the flux contains more than 5 per cent of lithium chloride. It is often inconvenient to make the joint so soon after the flux has been applied. As a result, the joining operation is impeded both from the standpoint of the interruption to apply flux and the formation of a large amount of oxide.

Not only do fluxes, containing water and lithium chloride, cause the formation of a large amount of oxide when they are in contact with the metal for even a few minutes, but they cause a pitting of the metal surface which interferes with the flow of fused filler metal. The subsequent fusion of the flux frequently does not effectively dispose of this additional oxide. The reaction between magnesium and water proceeds so rapidly that an imperfect joint often results, if the joint is not made immediately. This behavior of the flux is particularly disadvantageous in welding operations as mentioned above. Imperfectly welded joints are usually characterized by the presence of leaks, and it is necessary to reweld the area around each leak. If the joining operation is delayed after the application of the flux, magnesium oxide is produced in such quantities as to seriously retard the operation, and in many cases it becomes impossible to make a satisfactory joint. Various expedients have been proposed for the production of non-hygroscopic fluxes containing the desired quantities of lithium chloride, but none of these have been successful.

It is therefore an object of my invention to provide a flux for the fusion joining of magnesium members that contains lithium chloride and yet which does not react with magnesium in the presence of water to an appreciable extent. In particular, it is an object of my invention to provide a flux containing sufficient lithium chloride to insure proper action of the flux on the magnesium surface, that may be easily applied to the magnesium surface and which may be left in contact with that surface for reasonably long periods of time without interference with the subsequent fusion joining operation. A further object is the provision of a method for joining magnesium members through use of conventional chloride-containing fluxes but without the usual deleterious effect upon the metal prior to fusion of the flux. Still another object is the provision of means for increasing the speed with which fused joints can be made on magnesium members where a flux is used that contains lithium chloride. Another object of my invention is to provide a flux which does not cause the production of a large amount of oxide when applied to magnesium and yet when fused will efficiently remove the oxide coating from the magnesium surface and cause the molten metal to spread evenly to form a smooth, well filled joint, free from blisters and flux inclusions.

Other objects of the invention will become apparent from the following description and appended claims.

I have discovered that when very small amounts of certain chromates and dichromates are added to lithium chloride-containing fluxes, which also contain water, there is virtually no reaction at room temperature between the flux and the magnesium during the interval between applying the flux to the metal and the time the flux is fused in the joining operation. Yet there is no undesirable oxidation of the metal and interference with the proper joining of the members. It is possible to allow several hours, as much as 6 or 8, or even more, to elapse between the time the flux is applied and the time of making the joint. This period of time is relatively long as compared to the few minutes lapse of time which has been permissible heretofore. More particularly, I have found that the speed of fusion joining magnesium can be increased where it is necessary to leave the flux in contact with the metal for a relatively long period of time prior to the joining operation by inhibiting the formation of oxide by the flux containing water and chlorides. The particular salts which will inhibit this reaction are the dichromates of the metals sodium and potassium and the chromates of both these metals and those of magnesium, calcium, strontium, barium, zinc, and cadmium. Satisfactory results may be obtained through the use of about 0.01 to 0.2 per cent by weight of one or more of these chromates or dichromates, although I prefer to use about 0.05 to 0.1 per cent of this material. It has been found that less than 0.01 per cent of chromate is ineffective while more than 0.2 per cent interferes with the action of the flux.

I have discovered that a very satisfactory flux for welding magnesium may be obtained by adding a suitable chromate or dichromate to a flux containing lithium chloride, an alkali metal fluoride, and a carrier or vehicle made up of at least two alkali metal chlorides other than lithium chloride. By the term "alkali metals" I mean to include lithium, sodium, potassium, ribidium, and caesium, although only the salts of sodium, potassium, and lithium are commercially available in sufficient quantities to insure an adequate supply at reasonable cost. In the molten condition this flux has a very efficient cleansing action upon magnesium surfaces and removes any oxide films as well as grease and other adhering dirt, yet when applied to the metal surface or weld rod or wire prior to welding there is substantially no reaction with the magnesium at room temperature. As a result I have found that it is possible to weld magnesium faster than with the same flux without the chromate or dichromate addition where the welding is not done immediately after application of the flux to the metal. The molten flux also adheres to and wets the magnesium surface, thus protecting it against re-oxidation. Under the influence of the flux containing the chromate or dichromate the molten filler metal and magnesium form a smooth weld having the desired freedom from porosity and flux inclusions, even though the welding is not done immediately after application of the flux. It has been observed, furthermore, that a welded joint formed with the aid of this flux is usually free from leaks.

Flux compositions may be selected from the range of composition given hereinbelow that are satisfactory for use with any of the conventional methods of joining magnesium where a flux is required such as welding, brazing, and the like. Of the various welding methods employed, that of torch welding is most commonly used.

Filler metals of the type usually employed in joining magnesium members may be satisfactorily employed with the hereindescribed flux. The term "filler metal" as used herein refers to the metal that is introduced between the members being joined regardless of source. In fusion joining processes where a filler metal is used, this metal is at least partially melted and forms a bond with the parent metal.

Good results may be obtained in joining magnesium members by selecting a flux within the following ranges; from about 5 to 30 per cent by weight of lithium chloride, about 3 to 15 per cent by weight of an alkali metal fluoride, and about 5 to 50 per cent by weight of each alkali metal chloride comprising the vehicle, together with about 0.01 to 0.2 per cent of a suitable chromate or dichromate. I have found that a particularly desirable flux for welding magnesium is one composed of about 10 to 15 per cent by weight of lithium chloride, about 4.5 to 7 per cent by weight of lithium fluoride, about 5 to 50 percent by weight of sodium chloride, about 5 to 50 per cent by weight of potassium chloride, and about 0.05 to 0.1 per cent by weight of a suitable chromate or dichromate.

The melting points of fluxes to be used for welding magnesium should generally lie between about 1000° F. and 1180° F. to insure fusion below the melting point of magnesium (1202° F.), or magnesium base alloy filler material, as well as to properly clean and protect the metal. A different melting point range may be required, however, where other types of joining operations are employed. The flux compositions prepared in accordance with the disclosures made herein should be adjusted in any case to have melting points below the melting point of the filler metal. Generally, a flux that melts at about 1050° F. will be satisfactory for the welding of most magnesium articles.

It is known that magnesium articles may be protected against corrosion by dipping them in certain aqueous dichromate solutions. Because of this behavior of chromate and dichromate solutions upon magnesium surfaces, it was thought that to apply a flux containing a chromate or dichromate to a magnesium surface would only result in the immediate formation of a flux-impervious chromate coating whose presence would render welding more or less impossible. However, such proved not to be the case, for the addition of a suitable chromate or dichromate as described hereinabove resulted in the production of a flux superior to any other known in the art.

Where members are to be joined which have been dipped in a dichromate solution, the resultant coating must be completely removed from the area being joined in order to establish a metal-to-metal contact between the filler metal and the magnesium. Unless this is done, no joint can be made. This removal is generally effected by mechanical means such as by brushing with a wire brush, since most of the known fluxes will not penetrate this chromate coating. However, I have discovered that on some magnesium base alloys, the preferred flux mentioned hereinabove will remove the chromate coating and thus obviate the necessity for preliminary scratch brushing the surface.

For general use I find it most convenient to make up the flux in the form of a water suspension of paste-like consistency. Other substances than water may be used as a liquid medium provided they do not interfere with joining operation. However, water will normally be present no matter what other substance be used as a liquid medium since hygroscopic substances, such as lithium chloride, are included in the flux composition. A water suspension has the advantages of convenience and low cost, and it can be rapidly and easily painted upon the parts to be joined. Such a suspension will also readily adhere to a welding rod where it is dipped in the flux prior to being used.

Two welding fluxes which illustrate my invention and which have been found to be superior to the known fluxes, have the following percentage composition by weight.

(1) 39.1% NaCl, 39.1% KCl, 15.75% LiCl, 6% LiF, 0.05% $K_2Cr_2O_7$ (2) 40% NaCl, 40% KCl, 13.9% LiCl, 6% LiF, 0.1% $ZnCrO_4$

As an example of the manner in which magnesium parts can be welded, I will describe a particular butt welding operation in which was used the flux numbered (1) in the preceding paragraph. Two strips, 0.064 inch in thickness, of a magnesium base alloy composed of magnesium and 1.5 per cent manganese, had their respective edges to be joined covered with the flux in the form of a thick water paste. A welding rod of the same alloy was also dipped in this paste shortly before the welding was begun. The flux coated strips were mounted in a jig to hold the edges of the pieces in the desired abutting position. The welding was then carried on in the usual manner using an oxyacetylene welding flame. Several minutes elapsed between the time the flux was applied to the strips and the time when they were welded. This welding operation resulted in the production of a sound joint which was smooth and free from flux inclusions and leaks. In other tests I have found that even though the flux has been left in contact with the magnesium for several hours, a welded joint can be made as rapidly as if only a few minutes had elapsed between the time the flux was applied and the welding operation begun. The weld made with the dichromate-containing flux presented a slightly yellowish cast suggesting the presence of a thin chromate coating.

The specific examples of fluxes described hereinabove are merely illustrative of my invention and are not intended to limit the scope of the appended claims.

Having thus described my invention and particular embodiments thereof,

I claim:

1. In the art of fusion joining magnesium members the method of inhibiting the reaction at room temperature and in the presence of water between magnesium and an alkali metal halide flux containing lithium chloride comprising providing in said flux from about 0.01 to 0.2 per cent of at least one of the salts of the group consisting of the dichromates of sodium and potassium, and the chromates of sodium, potassium, barium, calcium, strontium, magnesium, zinc, and cadmium.

2. In the art of fusion joining magnesium members the method of inhibiting the reaction at room temperature and in the presence of water between magnesium and an alkali metal halide flux containing lithium chloride, alkali metal chlorides other than lithium chloride and an alkali metal fluoride, said method comprising providing in said flux from about 0.01 to 0.2 per cent of at least one of the salts of the group consisting of the dichromates of sodium and potassium, and the chromates of sodium, potassium, barium, calcium, strontium, magnesium, zinc, and cadmium.

3. An alkali metal halide flux for the fusion joining of magnesium members containing lithium chloride and from about 0.01 to 0.2 per cent of at least one of the group of inhibitor salts consisting of the dichromates of sodium and potassium, and the chromates of sodium, potassium, barium, calcium, strontium, magnesium, zinc, and cadmium, said flux being characterized by the fact that said inhibitor salt addition prevents substantial reaction at room temperature, in the presence of water, between said flux and the magnesium member.

4. An alkali metal halide flux for the fusion joining of magnesium members containing about 3 to 15 per cent of at least one alkali metal fluoride, about 5 to 30 per cent lithium chloride, and about 5 to 50 per cent each of at least two alkali metal chlorides other than lithium chloride, together with about 0.01 to 0.2 per cent of at least one of the inhibitor salts of the group consisting of the dichromates of sodium and potassium, and the chromates of sodium, potassium, barium, strontium, calcium, magnesium, cadmium and zinc, said flux being characterized by the fact that said inhibitor salt addition prevents substantial reaction at room temperature, in the presence of water, between said flux and the magnesium member.

5. An alkali metal halide flux for the fusion joining of magnesium members containing about 4.5 to 7 per cent of at least one alkali metal fluoride, about 10 to 15 per cent lithium chloride, and about 5 to 50 per cent each of at least two alkali metal chlorides other than lithium chloride, together with about 0.05 to 0.1 per cent of at least one of the inhibitor salts of the group consisting of the dichromates of sodium and potassium, and the chromates of sodium, potassium, barium, strontium, calcium, magnesium, cadmium and zinc, said flux being characterized by the fact that said inhibitor salt addition prevents substantial reaction at room temperature, in the presence of water, between said flux and the magnesium member.

6. An alkali metal halide flux for the fusion joining of magnesium members containing about 4.5 to 7 per cent lithium fluoride, about 5 to 30 per cent lithium chloride, about 5 to 50 per cent sodium chloride, and about 5 to 50 per cent potassium chloride, together with about 0.01 to 0.2 per cent of at least one of the inhibitor salts of the group consisting of the dichromates of sodium and potassium, and the chromates of sodium, potassium, barium, strontium, calcium, magnesium, cadmium and zinc, said flux being characterized by the fact that said inhibitor salt addition prevents substantial reaction at room temperature, in the presence of water, between said flux and the magnesium member.

7. A water suspension of a flux for welding magnesium composed of about 3 to 15 per cent lithium fluoride, about 5 to 30 per cent lithium chloride, about 5 to 50 per cent sodium chloride, and about 5 to 50 per cent potassium chloride, together with about 0.01 to 0.2 per cent of at least one of the inhibitor salts of the group consisting of the dichromates of sodium and potassium, and the chromates of sodium, potassium, barium, strontium, calcium, magnesium, cadmium and zinc.

MIKE A. MILLER.